(12) United States Patent
Hyun

(10) Patent No.: US 9,715,055 B2
(45) Date of Patent: Jul. 25, 2017

(54) DISPLAY DEVICE AND OPTICAL MEMBER

(75) Inventor: Soon Young Hyun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 15 days.

(21) Appl. No.: 14/232,850

(22) PCT Filed: Jul. 5, 2012

(86) PCT No.: PCT/KR2012/005353
§ 371 (c)(1),
(2), (4) Date: Jan. 21, 2014

(87) PCT Pub. No.: WO2013/009037
PCT Pub. Date: Jan. 17, 2013

(65) Prior Publication Data
US 2014/0185271 A1 Jul. 3, 2014

(30) Foreign Application Priority Data
Jul. 14, 2011 (KR) .................. 10-2011-0069798

(51) Int. Cl.
F21V 8/00 (2006.01)
F21V 13/14 (2006.01)
G02F 1/1335 (2006.01)

(52) U.S. Cl.
CPC ............ *G02B 6/0026* (2013.01); *F21V 13/14* (2013.01); *G02B 6/0021* (2013.01); *G02B 6/0023* (2013.01); G02B 6/0086 (2013.01); G02F 1/133615 (2013.01); G02F 2001/133614 (2013.01); G02F 2001/133628 (2013.01)

(58) Field of Classification Search
CPC .. G02B 6/0026; G02B 6/0021; G02B 6/0023; G02B 6/0086; F21V 13/14; G02F 1/133615; G02F 2001/133614; G02F 2001/133628
USPC .................................................... 362/84, 327
See application file for complete search history.

(56) References Cited

U.S. PATENT DOCUMENTS

| 5,998,925 | A | 12/1999 | Shimizu et al. | |
| 7,004,610 | B2 | 2/2006 | Yamashita et al. | |
| 7,040,774 | B2 * | 5/2006 | Beeson et al. | .................. 362/84 |
| 7,481,562 | B2 | 1/2009 | Chua et al. | |
| 7,795,055 | B2 | 9/2010 | Lee et al. | |
| 8,038,822 | B2 | 10/2011 | Kindler et al. | |

(Continued)

FOREIGN PATENT DOCUMENTS

| CN | 1758114 A | 4/2006 |
| CN | 1869788 A | 11/2006 |

(Continued)

OTHER PUBLICATIONS

European Search Report dated May 22, 2015 in European Application No. 12811675.3.

(Continued)

*Primary Examiner* — Anabel Ton
(74) *Attorney, Agent, or Firm* — Saliwanchik, Lloyd & Eisenschenk

(57) ABSTRACT

Disclosed are a display device and an optical member. The display device includes a light source, a wavelength conversion member provided adjacent to the light source, and a reflection-transmission part interposed between the light source and the wavelength conversion member.

18 Claims, 6 Drawing Sheets

(56) References Cited

U.S. PATENT DOCUMENTS

| | | |
|---|---|---|
| 8,545,083 B2 | 10/2013 | Terajima et al. |
| 9,110,200 B2 | 8/2015 | Nichol et al. |
| 9,244,209 B2 | 1/2016 | Lee et al. |
| 9,304,355 B2 | 4/2016 | Lee |
| 9,335,459 B2 | 5/2016 | Kang |
| 2001/0001207 A1 | 5/2001 | Shimizu et al. |
| 2002/0001055 A1 | 1/2002 | Kimura et al. |
| 2002/0071071 A1 | 6/2002 | Sekiguchi et al. |
| 2003/0066998 A1 | 4/2003 | Lee |
| 2003/0165781 A1 | 9/2003 | Takeda |
| 2004/0046242 A1 | 3/2004 | Asakawa |
| 2004/0190279 A1 | 9/2004 | Kitamura |
| 2005/0001225 A1 | 1/2005 | Yoshimura et al. |
| 2005/0221519 A1 | 10/2005 | Leung et al. |
| 2006/0002101 A1 | 1/2006 | Wheatley et al. |
| 2006/0034084 A1 | 2/2006 | Matsuura et al. |
| 2006/0034579 A1 | 2/2006 | Sugiura |
| 2006/0072315 A1 | 4/2006 | Han et al. |
| 2006/0092666 A1 | 5/2006 | Jeong et al. |
| 2006/0132034 A1 | 6/2006 | Cho et al. |
| 2006/0227532 A1 | 10/2006 | Ko et al. |
| 2006/0227570 A1 | 10/2006 | Rutherford et al. |
| 2006/0268537 A1 | 11/2006 | Kurihara et al. |
| 2006/0268579 A1 | 11/2006 | Han et al. |
| 2007/0004195 A1 | 1/2007 | Park et al. |
| 2007/0012940 A1 | 1/2007 | Suh et al. |
| 2007/0176196 A1 | 8/2007 | Kim et al. |
| 2007/0210326 A1 | 9/2007 | Kurihara |
| 2007/0221865 A1 | 9/2007 | Sohn et al. |
| 2007/0221866 A1 | 9/2007 | Sohn et al. |
| 2007/0221943 A1 | 9/2007 | Moriya et al. |
| 2007/0228390 A1 | 10/2007 | Hattori et al. |
| 2007/0229736 A1 | 10/2007 | Wang et al. |
| 2007/0263408 A1 | 11/2007 | Chua |
| 2008/0037272 A1 | 2/2008 | Song et al. |
| 2008/0112186 A1 | 5/2008 | Jung et al. |
| 2008/0237540 A1 | 10/2008 | Dubrow |
| 2008/0284316 A1 | 11/2008 | Kurihara et al. |
| 2009/0014688 A1 | 1/2009 | Hoshino et al. |
| 2009/0021148 A1 | 1/2009 | Hachiya et al. |
| 2009/0034292 A1 | 2/2009 | Pokrovskiy et al. |
| 2009/0040598 A1* | 2/2009 | Ito ................................ 359/332 |
| 2009/0115936 A1 | 5/2009 | Takeuchi et al. |
| 2009/0147497 A1 | 6/2009 | Nada |
| 2009/0152567 A1 | 6/2009 | Comerford et al. |
| 2009/0173957 A1 | 7/2009 | Brunner et al. |
| 2009/0231847 A1 | 9/2009 | Pan et al. |
| 2010/0079901 A1 | 4/2010 | Fukushima |
| 2010/0110728 A1 | 5/2010 | Dubrow et al. |
| 2010/0155749 A1 | 6/2010 | Chen et al. |
| 2010/0164364 A1 | 7/2010 | Eida et al. |
| 2010/0187975 A1 | 7/2010 | Tsukahara et al. |
| 2010/0232133 A1 | 9/2010 | Tran et al. |
| 2010/0232134 A1 | 9/2010 | Tran |
| 2010/0283072 A1 | 11/2010 | Kazlas et al. |
| 2010/0295438 A1* | 11/2010 | Ott et al. ...................... 313/46 |
| 2010/0302493 A1 | 12/2010 | Yang et al. |
| 2010/0315320 A1 | 12/2010 | Yoshida |
| 2011/0002140 A1 | 1/2011 | Tsukahara et al. |
| 2011/0037926 A1 | 2/2011 | Tsukahara et al. |
| 2011/0044046 A1* | 2/2011 | Abu-Ageel .................. 362/259 |
| 2011/0090696 A1 | 4/2011 | Nagai et al. |
| 2011/0141769 A1 | 6/2011 | Lee et al. |
| 2011/0156575 A1 | 6/2011 | Yu et al. |
| 2011/0176328 A1 | 7/2011 | Anandan et al. |
| 2011/0205750 A1* | 8/2011 | Krijn .................... G02B 6/0018 362/551 |
| 2011/0249424 A1 | 10/2011 | Joo et al. |
| 2011/0261303 A1 | 10/2011 | Jang et al. |
| 2011/0299011 A1 | 12/2011 | Weiss et al. |
| 2012/0106197 A1 | 5/2012 | Lai et al. |
| 2012/0113672 A1 | 5/2012 | Dubrow et al. |
| 2012/0170282 A1 | 7/2012 | Lin et al. |
| 2013/0128548 A1 | 5/2013 | Lin |
| 2014/0049826 A1 | 2/2014 | Lee et al. |
| 2014/0153218 A1* | 6/2014 | Hyun ................ G02F 1/133615 362/84 |
| 2014/0160789 A1* | 6/2014 | Park ..................... G02B 6/0023 362/608 |
| 2014/0168571 A1* | 6/2014 | Hyun ................ G02F 1/133615 349/61 |
| 2015/0369993 A1* | 12/2015 | Kim ....................... G02B 6/009 362/610 |

FOREIGN PATENT DOCUMENTS

| | | |
|---|---|---|
| CN | 1880839 A | 12/2006 |
| CN | 1881034 A | 12/2006 |
| EP | 2068193 A2 | 6/2009 |
| JP | 09-073807 A | 3/1997 |
| JP | 2004303441 A | 10/2004 |
| JP | 2004315661 A | 11/2004 |
| JP | 2007005098 A | 1/2007 |
| JP | 2007173754 A | 7/2007 |
| JP | 2008287073 A | 11/2008 |
| JP | 2008-311234 A | 12/2008 |
| JP | 2009200534 A | 9/2009 |
| JP | 2010123918 A | 6/2010 |
| KR | 20060056834 A | 5/2006 |
| KR | 20060125535 A | 12/2006 |
| KR | 20060129835 A | 12/2006 |
| KR | 20070092440 A | 9/2007 |
| KR | 20080007247 A | 1/2008 |
| KR | 20080063986 A | 7/2008 |
| KR | 20090021912 A | 3/2009 |
| KR | 20100024420 A | 3/2010 |
| KR | 20100027892 A | 3/2010 |
| KR | 20100046698 A | 5/2010 |
| KR | 20100047841 A | 5/2010 |
| KR | 20100118557 A | 11/2010 |
| KR | 20100129030 A | 12/2010 |
| KR | 10-2011-0012246 A | 2/2011 |
| KR | 20110068110 A | 6/2011 |
| KR | 20120001387 A | 1/2012 |
| KR | 1020120070449 A | 6/2012 |
| KR | 1020130009022 A | 1/2013 |
| TW | 200409384 | 6/2004 |
| TW | 200702822 | 1/2007 |
| TW | 200739192 | 10/2007 |
| TW | 200803600 A | 1/2008 |
| TW | 200848809 A | 12/2008 |
| TW | 201035484 A | 10/2010 |
| TW | 201041191 A | 11/2010 |
| TW | 201044067 A | 12/2010 |
| TW | 201105767 A | 2/2011 |
| WO | WO-2012144720 A1 | 10/2012 |

OTHER PUBLICATIONS

International Search Report in International Application No. PCT/KR2012/005353, filed Jul. 5, 2012.
International Search Report in International Application No. PCT/KR2012/004625, dated Dec. 24, 2012.
Notice of Allowance dated Apr. 12, 2013 in Korean Application No. 10-2011-0071135.
European Search Report in European Application no. 12814589.3, dated Apr. 16, 2015.
Office Action dated Jun. 25, 2014 in Taiwanese Application No. 10-1121880.
Final Office Action dated Jul. 30, 2015 in U.S. Appl. No. 14/233,440.
European Search Report dated Sep. 7, 2015 in European Application No. 15172626.2.
International Search Report in International Application No. PCT/KR2012/004611, filed Jun. 11, 2012.
Taiwanese Office Action dated Jan. 23, 2015 in Taiwanese Application No. 101125849.
European Search Report dated Feb. 12, 2015 in International Application No. PCT/KR2012/004611.
International Search Report in International Application No. PCT/KR2012/004521, filed Jun. 8, 2012.

(56) References Cited

OTHER PUBLICATIONS

Office Action dated Dec. 3, 2014 in Taiwanese Application No. 101121510.
Office Action dated Dec. 24, 2012 in Korean Application No. 10-2011-0069797.
Office Action dated Aug. 18, 2015 in U.S. Appl. No. 14/232,843.
International Search Report in International Application No. PCT/KR2011/009232, filed Nov. 30, 2011.
Office Action dated Jul. 31, 2012 in Korean Application No. 10-2011-0009833.
Office Action dated Mar. 13, 2015 in U.S. Appl. No. 13/982,916.
Office Action dated Mar. 16, 2016 in U.S. Appl. No. 13/982,916.
International Search Report in International Application No. PCT/KR2012/006308, filed Aug. 8, 2012.
Office Action dated Jan. 28, 2016 in Chinese Application No. 201280066300.9.
Office Action dated Aug. 30, 2016 in U.S. Appl. No. 14/234,123.
Office Action dated Jun. 19, 2015 in U.S. Appl. No. 14/234,123.
Office Action dated Dec. 14, 2016 in U.S. Appl. No. 14/234,123.
Office Action dated Nov. 25, 2016 in U.S. Appl. No. 14/747,577.
Office Action dated Dec. 29, 2016 in U.S. Appl. No. 15/136,239.
Office Action dated Jul. 5, 2016 in U.S. Appl. No. 14/356,657.
Office Action dated Jan. 5, 2017 in U.S. Appl. No. 14/356,657.
European Search Report in European Application No. 12814403.7 dated Feb. 13, 2015.
International Search Report in International Application No. PCT/KR2012/005418, filed Jul. 9, 2012.
Office Action dated Apr. 6, 2016 in Taiwanese Application No. 101126235.
Office Action dated Jul. 6, 2015 in U.S. Appl. No. 14/234,117.
Office Action dated Jan. 21, 2016 in U.S. Appl. No. 14/234,117.
Office Action dated Jul. 6, 2015 in U.S. Appl. No. 14/232,850.
Office Action dated Jun. 1, 2016 in U.S. Appl. No. 14/232,850.
Notice of Allowance dated Nov. 17, 2016 in U.S. Appl. No. 14/232,850.
Office Action dated Jun. 24, 2014, in Taiwanese Application No. 101122681.
European Search Report in European Application No. 12815508.2 filed May 28, 2014.
International Search Report in International Application No. PCT/KR2012/004610, filed Dec. 24, 2012.

* cited by examiner

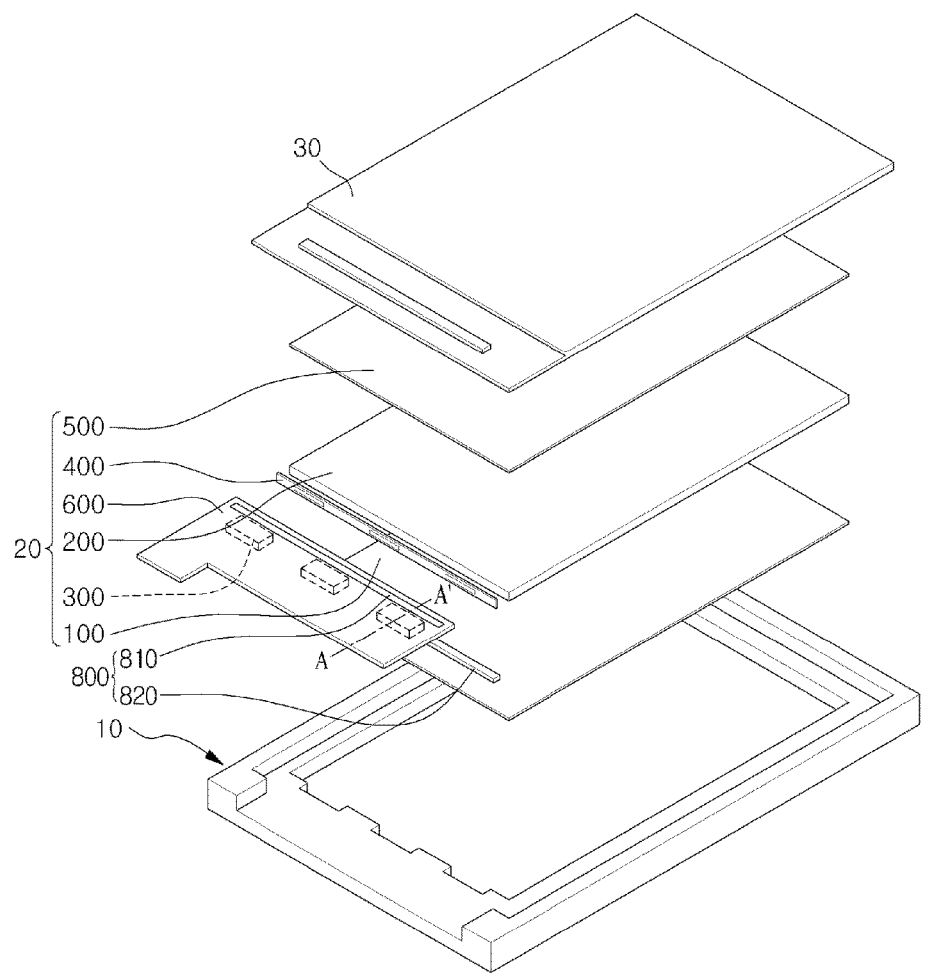
[Fig. 1]

[Fig. 2]
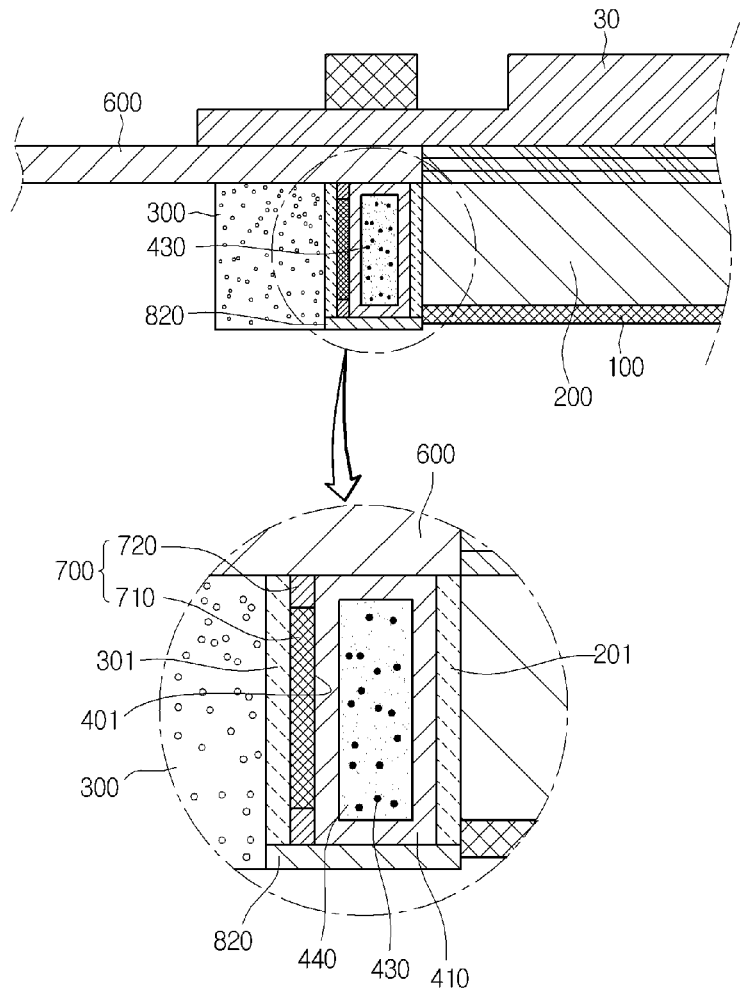
[Fig. 3]
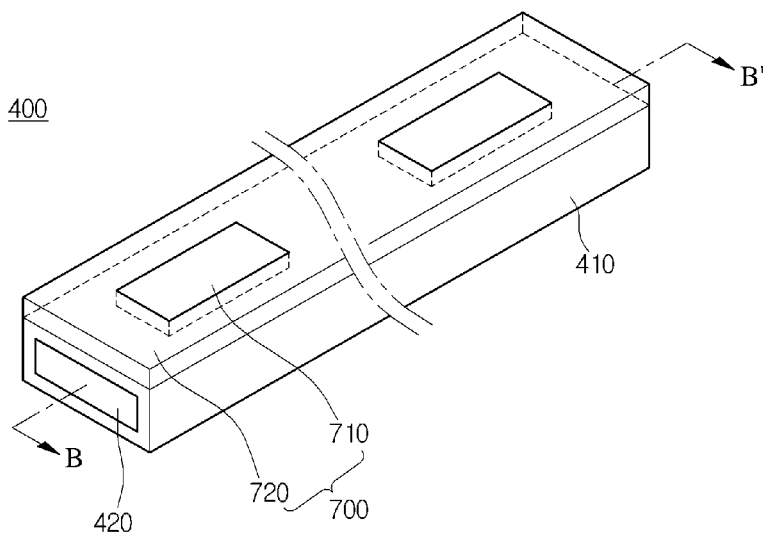

[Fig. 7]
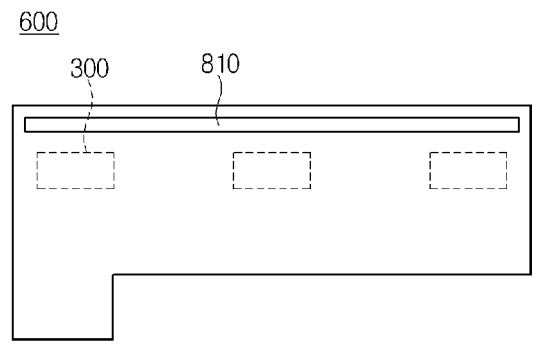
[Fig. 8]
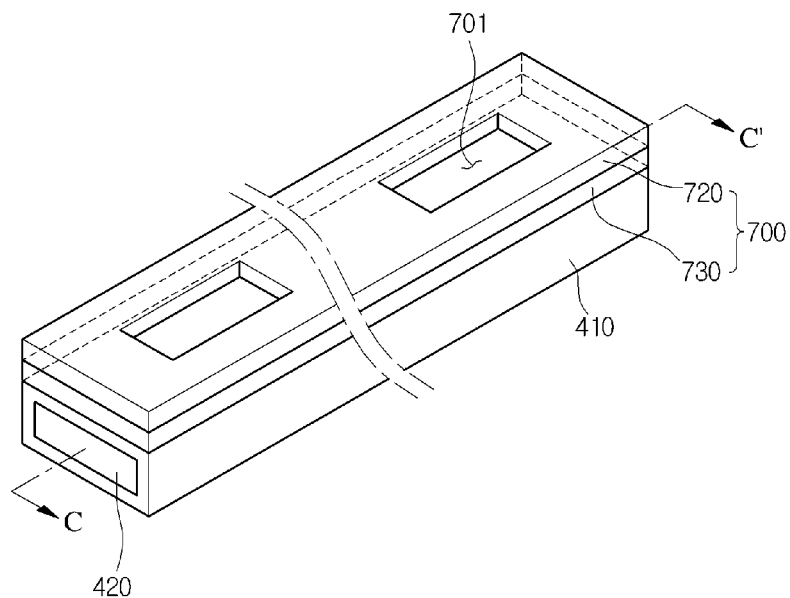
[Fig. 9]
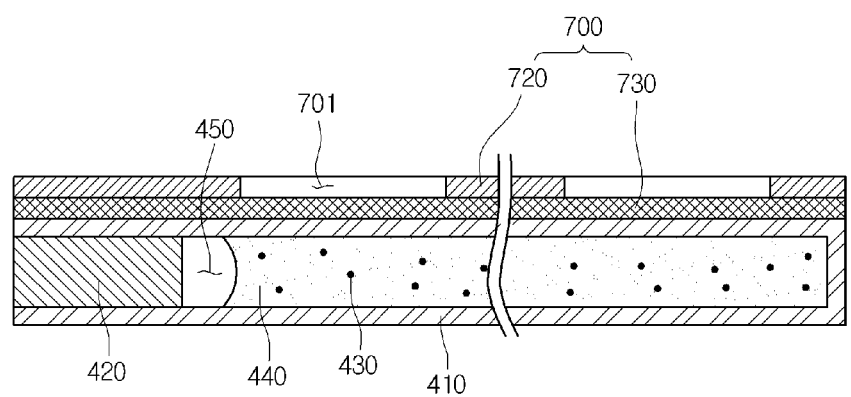

DISPLAY DEVICE AND OPTICAL MEMBER

CROSS-REFERENCE TO RELATED APPLICATIONS

This application is the U.S. national stage application of International Patent Application No. PCT/KR2012/005353, filed Jul. 5, 2012, which claims priority to Korean Application No. 10-2011-0069798, filed Jul. 14, 2011, the disclosures of each of which are incorporated herein by reference in their entirety.

TECHNICAL FIELD

The embodiment relates to a display device.

BACKGROUND ART

Some display devices require a backlight unit to generate light in order to display an image. The backlight unit supplies the light to a display panel including liquid crystal. The backlight unit includes a light emitting device and units to effectively transfer light output from the light emitting device toward the liquid crystal.

Light emitting diodes (LEDs) may be employed as a light source of the display device. Further, in order to effectively transfer the light output from the light source toward the display panel, a light guide plate and an optical sheet may be stacked and used.

In this case, optical members, which convert the wavelength of the light generated from the light source so that white light may be incident into the light guide plate or the display panel, are applicable to the display device. In particular, in order to convert the wavelength of the light, quantum dos may be used.

The quantum dots have a particle size of 10 nm or less, and represent unique electro-optical characteristics according to the particle size. For example, when the quantum dot substantially has the particle size of 55 Å to 65 Å, 40 Å to 50 Å, or 20 Å to 35 Å, the quantum dot represents red-based colors, green-based colors, or blue-based colors, respectively. If the quantum dot represents a yellow color, the quantum dot may have an intermediate particle size between the particles sizes of the quantum dots representing a red color and a green color. As the spectrum according to the wavelength of light is changed from the red color to the blue color, the size of the quantum dot is sequentially changed from about 65 Å to about 20 Å. The numerical values may have error.

In order to form an optical member including quantum dots, a quantum dot representing RGB, which constitute the three primary colors of light, or RYGB may be formed through a spin coating process or a printing process for a transparent substrate including glass. In this case, if the optical member further includes quantum dots representing a yellow color (Y), white light closer to natural light may be obtained. A matrix (medium) that carries quantum dots by dispersing the quantum dots may include an inorganic material or polymer to emit visible light and UV-band light (including Far UV light) or to represent superior transmittance with respect to the visible-band light. For example, the above material may include inorganic silica, poly-methyl-methacrylate (PMMA), polydimethylsiloxane (PDMS), poly lactic acid (PLA), silicon polymer, or YAG. In particular, the quantum dots and the medium may be denatured or damaged due to heat.

The display device to which the quantum dots are applied is disclosed in Korean Unexamined Patent Publication No. 10-2011-0012246.

DISCLOSURE OF INVENTION

Technical Problem

The embodiment provides a display device representing improved brightness and color reproduction.

Solution to Problem

According to the embodiment, there is provided a display device including a light source, a wavelength conversion member provided adjacent to the light source, and a reflection-transmission part interposed between the light source and the wavelength conversion member.

According to the embodiment, there is provided an optical member including a wavelength conversion member, and a reflection-transmission part on at least one surface of the wavelength conversion member. The reflection-transmission part includes a transmission part to transmit an incident light to the wavelength conversion member, and a reflection part provided beside the transmission part to reflect a light output from the wave conversion member.

Advantageous Effects of Invention

The display device according to the embodiment includes the reflection-transmission part. The light output from the light source can be incident into the wavelength conversion member through the transmission part of the reflection-transmission part. In addition, the light output from the wavelength conversion member toward the light source can be reflected toward the wavelength conversion member by the reflection part of the reflection-transmission part.

Therefore, the display device according to the embodiment can reduce the loss of light output from the wavelength conversion member to the light source. Accordingly, the display device according to the embodiment can represent improved brightness.

In addition, the path of the light incident into the wavelength conversion member can be increased by the reflection part. Accordingly, the display device according to the embodiment can represent improved wavelength conversion efficiency and improved color reproduction.

BRIEF DESCRIPTION OF DRAWINGS

FIG. 1 is an exploded perspective view showing a liquid crystal display device according to a first embodiment;

FIG. 2 is a sectional view taken along line A-A' of FIG. 1;

FIG. 3 is a perspective view showing a wavelength conversion member and a reflection-transmission part according to the first embodiment;

FIG. 7 is a plan view showing the flexible printed circuit board;

FIG. 8 is a perspective view showing a wavelength conversion member and a reflection-transmission part according to a second embodiment;

FIG. 9 is a sectional view taken along line C-C' of FIG. 8;

MODE FOR THE INVENTION

Figure 4:
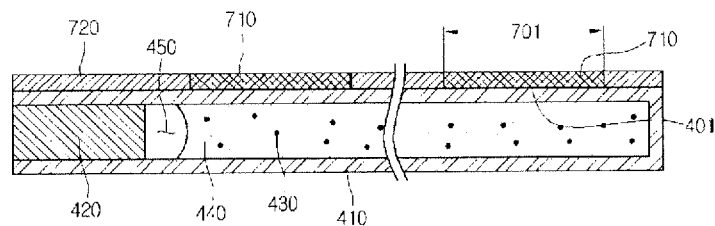
FIG. 4 is a sectional view taken along line B-B' of FIG. 3.

In the description of the embodiments, it will be understood that, when a substrate, a frame, a sheet, a layer, or a pattern is referred to as being "on" or "under" another substrate, another frame, another sheet, another layer, or another pattern, it can be "directly" or "indirectly" on the other substrate, the other frame, the other sheet, the other layer, or the other pattern, or one or more intervening layers may also be present. Such a position of each component has been described with reference to the drawings. The thickness and size of each component shown in the drawings may be exaggerated, omitted or schematically drawn for the purpose of convenience or clarity. In addition, the size of components does not utterly reflect an actual size.

Figure 5:
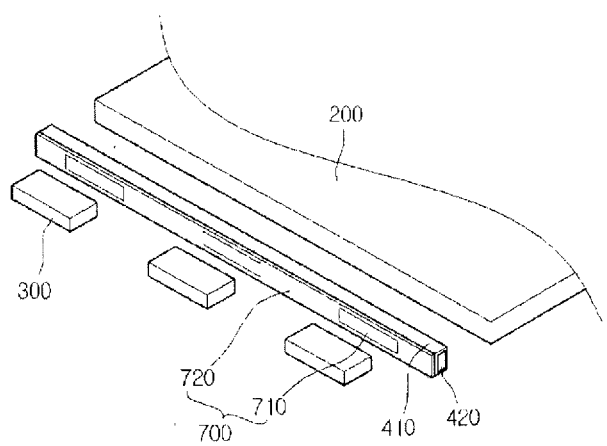
FIG. 5 is a perspective view showing a light emitting diode, a reflection-transmission part, a wavelength conversion member, and a light guide plate according to the first embodiment.
Figure 6:
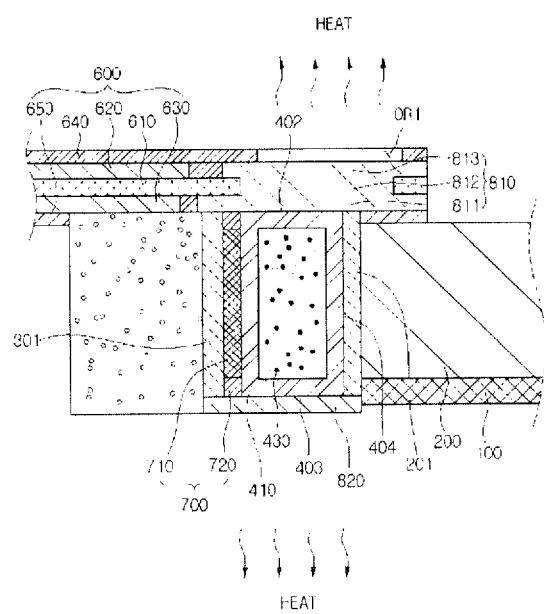
FIG. 6 is a sectional view showing a light emitting diode, a flexible printed circuit board, a wavelength conversion member, and a light guide plate according to the first embodiment.

FIG. 1 is an exploded perspective view showing a liquid crystal display device according to a first embodiment, FIG. 2 is a sectional view taken along line A-A' of FIG. 1, and FIG. 3 is a perspective view showing a wavelength conversion member and a reflection-transmission part according to the first embodiment. FIG. 4 is a sectional view taken along line B-B' of FIG. 3, FIG. 5 is a perspective view showing a light emitting diode, a reflection-transmission part, a wavelength conversion member, and a light guide plate according to the first embodiment, and FIG. 6 is a sectional view showing a light emitting diode, a flexible printed circuit board, a wavelength conversion member, and a light guide plate according to the first embodiment. FIG. 7 is a plan view showing the flexible printed circuit board.

Referring to FIGS. 1 to 7, a liquid crystal display according to the embodiment includes a mold frame 10, a backlight assembly 20, and a liquid crystal panel 30.

The mold frame 10 receives the backlight assembly 20 and the liquid crystal panel 30. The mold frame 10 has a rectangular frame shape and may include plastic or reinforced plastic.

In addition, a chassis may be disposed below the mold frame 10 to surround the mold frame 10 and support the backlight assembly 20. The chassis may also be disposed at a lateral side of the mold frame 10.

The backlight assembly 20 is disposed in the mold frame 10 to supply the light toward the liquid crystal panel 30. The backlight assembly 20 includes a reflective sheet 100, a light guide plate 200, a light source such as light emitting diodes 300, a wavelength conversion member 400, a reflection-transmission part 700, a heat dissipation part 800, a plurality of optical sheets 500, and a flexible printed circuit board (FPCB) 600.

The reflective sheet 100 reflects the light upward as the light is generated from the light emitting diodes 300.

The light guide plate 200 is disposed on the reflective sheet 100 to reflect the light upward by totally reflecting, refracting and scattering the light incident thereto from the light emitting diodes 300.

The light guide plate 200 includes an incident surface directed toward the light emitting diodes 300. From among lateral sides of the light guide plate 200, a lateral side directed toward the light emitting diodes 300 may serve as the incident surface.

The light emitting diodes 300 are disposed at the lateral side of the light guide plate 200. In detail, the light emitting diodes 300 are disposed at the incident surface.

The light emitting diodes 300 serve as a light source for generating the light. In detail, the light emitting diodes 300 emit the light toward the wavelength conversion member 400.

The light emitting diodes 300 generate a first light. For example, the first light may include a blue light. In other words, the light emitting diodes 300 may include a blue light emitting diode generating the blue light. The first light may include the blue light having the wavelength band of about 430 nm to about 470 nm. In addition, the light emitting diodes 300 may generate UV light.

The light emitting diodes 300 are mounted on the FPCB 600. The light emitting diodes 300 are disposed under the FPCB 600. The light emitting diodes 300 are driven by receiving a driving signal through the FPCB 600.

The wavelength conversion member 400 is interposed between the light emitting diodes 300 and the light guide plate 200. In detail, the wavelength conversion member 400 is bonded to the lateral side of the light guide plate 200. In more detail, the wavelength conversion member 400 is attached to the incident surface of the light guide plate 200. In addition, the wavelength conversion member 400 can be bonded to the light emitting diodes 300.

The wavelength conversion member 400 receives the light from the light emitting diodes 300 to convert the wavelength of the light. For instance, the wavelength conversion member 400 can convert the first light emitted from the light emitting diodes 300 into second and third lights.

In this case, the second light may include a red light, and the third light may include a green light. In other words, the wavelength conversion member 400 converts a part of the light into a red light having the wavelength in the range of about 630 nm to about 660 nm, and converts a part of the first light into the green light having the wavelength in the range of about 520 nm to about 560 nm.

Therefore, the white light may be generated by the first light passing through the wavelength conversion member 400 and the second and third lights converted by the wavelength conversion member 400. In detail, the white light can be incident into the light guide plate 200 through the combination of the first, second, and third lights.

As shown in FIGS. 2 to 4, the wavelength conversion member 400 includes a tube 410, a sealing member 420, a plurality of wavelength conversion particles 430, and a host 440.

The tube 410 receives the sealing part 420, the wavelength conversion particles 430 and the host 440 therein. That is, the tube 410 may serve as a receptacle to receive the sealing part 420, the wavelength conversion particles 430 and the host 440. In addition, the tube 410 extends with a long length in one direction.

The tube 410 may have the form of a rectangular tube 410. In detail, a section of the tube 410, which is vertical to the length direction of the tube 410, may have the rectangular shape. The tube 410 may have a width of about 0.6 mm and a height of about 0.2 mm. The tube 410 may include a capillary tube.

The tube 410 is transparent. The tube 410 may include glass. In detail, the tube 410 may include a glass capillary tube.

The sealing member 420 is provided in the tube 410. The sealing member 420 is provided at the end portion of the tube 410. The sealing member 420 seals the inner part of the tube 410. The sealing member 420 may include an epoxy resin.

The wavelength conversion particles 430 are provided in the tube 410. In detail, the wavelength conversion particles 430 are uniformly distributed in the host 440 installed in the tube 410.

The wavelength conversion particles 430 convert the wavelength of the light emitted from the light emitting diodes 300. In detail, the light is incident into the wavelength conversion particles 430 from the light emitting diodes 300 and the wavelength conversion particles 430 convert the wavelength of the incident light. For instance, the wavelength conversion particles 430 can convert the blue light emitted from the light emitting diodes 300 into the green light and the red light. That is, a part of the wavelength conversion particles 430 converts the blue light into the green light having the wavelength in the range of about 520 nm to about 560 nm and a part of the wavelength conversion particles 430 converts the blue light into the red light having the wavelength in the range of about 630 nm to about 660 nm.

In addition, the wavelength conversion particles 430 can convert the UV light emitted from the light emitting diodes 300 into the blue light, the green light and the red light. That is, a part of the wavelength conversion particles 430 converts the UV light into the blue light having the wavelength in the range of about 430 nm to about 470 nm, and a part of the wavelength conversion particles 430 converts the UV light into the green light having the wavelength in the range of about 520 nm to about 560 nm. Further, a part of the wavelength conversion particles 430 converts the UV light into the red light having the wavelength in the range of about 630 nm to about 660 nm.

In other words, if the light emitting diodes 300 are blue light emitting diodes that emit the blue light, the wavelength conversion particles 430 capable of converting the blue light into the green light and the red light may be employed. In addition, if the light emitting diodes 300 are UV light emitting diodes that emit the UV light, the wavelength conversion particles 430 capable of converting the UV light into the blue light, the green light and the red light may be employed.

The wavelength conversion particles 430 may include a plurality of quantum dots. The quantum dots may include core nano-crystals and shell nano-crystals surrounding the core nano-crystals. In addition, the quantum dots may include organic ligands bonded to the shell nano-crystals. In addition, the quantum dots may include an organic coating layer surrounding the shell nano-crystals.

The shell nano-crystals may be prepared as at least two layers. The shell nano-crystals are formed on the surface of the core nano-crystals. The quantum dots can lengthen the wavelength of the light incident into the core nano-crystals by using the shell nano-crystals forming a shell layer, thereby improving the light efficiency.

The quantum dots may include at least one of a group-II compound semiconductor, a group-III compound semiconductor, a group-V compound semiconductor, and a group-VI compound semiconductor. In more detail, the core nano-crystals may include CdSe, InGaP, CdTe, CdS, ZnSe, ZnTe, ZnS, HgTe or HgS. In addition, the shell nano-crystals may include CuZnS, CdSe, CdTe, CdS, ZnSe, ZnTe, ZnS, HgTe or HgS. The quantum dot may have a diameter of about 1 nm to about 10 nm.

The wavelength of the light emitted from the quantum dots can be adjusted according to the size of the quantum dot. The organic ligand may include pyridine, mercapto alcohol, thiol, phosphine, and phosphine oxide. The organic ligand may stabilize the unstable quantum dots after the synthesis process. Dangling bonds may be formed at the valence band after the synthesis process and the quantum dots may be unstable due to the dangling bonds. However, since one end of the organic ligand is the non-bonding state, one end of the organic ligand is bonded with the dangling bonds, thereby stabilizing the quantum dots.

In particular, if the size of the quantum dot is smaller than the Bohr radius of an exciton, which consists of an electron and a hole excited by light and electricity, the quantum confinement effect may occur, so that the quantum dot may have the discrete energy level. Thus, the size of the energy gap is changed. In addition, the charges are confined within the quantum dot, so that the light emitting efficiency can be improved.

Different from general fluorescent pigments, the fluorescent wavelength of the quantum dot may vary depending on the size of the particles. In detail, the light has the shorter wavelength as the size of the particle becomes small, so the fluorescent light having the wavelength band of visible ray can be generated by adjusting the size of the particles. In addition, the quantum dot represents the extinction coefficient, which is 100 to 1000 times higher than that of the general fluorescent pigment, and has the superior quantum yield as compared with the general fluorescent pigment, so that that strong fluorescent light can be generated.

The quantum dots can be synthesized through the chemical wet scheme. The chemical wet scheme is to grow the particles by immersing the precursor material in the organic solvent. According to the chemical wet scheme, the quantum dots can be synthesized.

The host 440 surrounds the wavelength conversion particles 430. In detail, the wavelength conversion particles 430 are uniformly distributed in the host 440. The host 440 includes polymer. The host 440 is transparent. That is, the host 440 includes transparent polymer.

The host 440 is disposed in the tube 410. In detail, the host 440 is fully filled in the tube 410. The host 440 may adhere to an inner surface of the tube 410.

An air layer 450 is formed between the sealing member 420 and the host 440. The air layer 450 is filled with nitrogen. The air layer 450 performs the damping function between the sealing member 420 and the host 440.

The wavelength conversion member 400 may be formed through the following method.

First, the wavelength conversion particles 430 may be uniformly distributed into resin composition. The resin composition is transparent. The resin composition may have a photo-curable property.

Then, internal pressure of the tube 410 is reduced, an inlet of the tube 410 is immersed in the resin composition in which the wavelength conversion particles 430 are distributed, and external pressure is increased. Thus, the resin composition having the wavelength conversion particles 430 is introduced into the tube 410.

After that, a part of the resin composition introduced into the tube 410 is removed and the inlet of the tube 410 is empty.

Thereafter, the resin composition introduced into the tube 410 is cured by UV light, thereby forming the host 440.

Then, epoxy resin composition is introduced into the inlet of the tube 410. The epoxy resin composition is cured so that the wavelength conversion part 420 is formed. The process for forming the wavelength conversion part 420 is performed under the nitrogen atmosphere, so the air layer including nitrogen is formed between the wavelength conversion part 420 and the matrix 440.

The reflection-transmission part 700 is interposed between the light emitting diodes 300 and the wavelength conversion member 400. In more detail, the reflection-transmission part 700 may be arranged close to the wavelength conversion member 400. The reflection-transmission part 700 may directly make contact with the wavelength conversion member 400. The reflection-transmission part 700 may be directly provided on a light incident surface 401 of the wavelength conversion member 400. In more detail, the reflection-transmission part 700 may be bonded with the wavelength conversion member 400. Accordingly, the reflection-transmission part 700 and the wavelength conversion member 400 are coupled with each other to constitute one optical member.

The reflection-transmission part 700 transmits a part of light and reflects a part of the light. In more detail, the reflection-transmission part 700 transmits light output from the light emitting diodes 300 to the wavelength conversion member 400, and light output from the wavelength conversion member 400 toward the light emitting diodes 300 is reflected into the wavelength conversion member 400. The reflection-transmission part 700 includes a plurality of transmission parts 710 and reflection parts 720.

The transmission parts 710 may correspond to the light emitting diodes 300, respectively. The size of each transmission part 710 may correspond to or be greater than the size of the light exit surface of each light emitting diode 300. An outer portion of the transmission part 710 may surround an outer portion of the light exit surface of the light emitting diode 300.

The transmission parts 710 are transparent. The material constituting the transparent parts 710 may include an inorganic material such as silicon oxide or magnesium fluoride (MgF$_2$). The transmission parts 710 are transmission layers formed on the light incident surface 401 of the wavelength conversion member 400. In other words, the transmission parts 710 may include transparent electrodes directly formed on the light incident surface 401 of the wavelength conversion member 400.

The transmission parts 710 may perform the function of an anti-reflective layer. In other words, the transmission parts 710 may include an anti-reflective layer formed on the light incident surface 401 of the wavelength conversion member 400. The transmission parts 710 are coated on the light incident surface 401 of the wavelength conversion member 400 to perform a function of reducing the significant variation of the refractive index of incident light.

The reflection part 720 is provided beside the transmission parts 710. The reflection part 720 is provided around the transmission parts 710. The reflection part 720 may surround the transmission parts 710. In other words, the transmission parts 710 may be provided in a plurality of transmission holes 701 formed through the reflection part 720. The transmission holes 701 may expose the light incident surface 401 of the wavelength conversion member 400.

The reflection part 720 may be provided throughout the whole light incident surface 401 of the wavelength conversion member 400. In this case, the reflection part 720 may not be arranged in the region of the transmission parts 710. In addition, the reflection part 720 includes a reflective layer formed on the light incident surface 401 of the wavelength conversion member 400. In this case, the reflective layer may be directly arranged on the light incident surface 401 of the wavelength conversion member 400. Therefore, the reflective layer and the transmission layer may be aligned in line with each other.

The reflection part 720 reflects incident light. The material constituting the reflection part 720 may include metal representing a high reflective index or particles representing a high refractive index.

For example, the reflection part 720 may include a metallic layer or an alloy layer. In more detail, the reflection part 720 may include silver (Ag) or aluminum (Al). In addition, the reflection part 720 may include the alloy of the metals.

In addition, the reflection part 720 may include white ink.

In addition, the reflection part 720 may include mineral particles representing a high refractive index. For example, the reflection part 720 may include a plurality of titanium oxide particles. In more detail, the titanium oxide particles are uniformly distributed into a transparent resin layer to constitute the reflection part 720 together with the transparent resin layer. In other words, the reflection part 720 may include the transparent resin layer and high-refractive particles uniformly distributed into the transparent resin layer.

The reflection part 720 may be opaque. In addition, the reflection part 720 may be semitransparent.

In addition, the reflection-transmission part 700 may represent high thermal conductivity. In particular, when the reflection part 720 includes metal, the reflection part 720 may represent thermal conductivity in the range of about 22 Kcal/m·hr·° C. to about 400 Kcal/m·hr·° C.

The reflection-transmission part 700 is connected to the heat dissipating part 800. The reflection-transmission part 700 may be directly or indirectly connected to the heat dissipating part 800. Therefore, the reflection-transmission part 700 may easily dissipate heat introduced into the wavelength conversion member 400 through the heat dissipating part 800.

The reflection-transmission part 700 is provided in opposition to the wavelength conversion member 400. The reflection-transmission part 700 extends in the same direction as the extension direction of the wavelength conversion member 400. The reflection-transmission part 700 may be substantially parallel to the wavelength conversion member 400.

The reflection-transmission part 700 may be formed through a deposition process or a screen printing process employing paste.

The light output from the light emitting diodes 300 is incident into the wavelength conversion member 400 through the transmission parts 710. In addition, the reflection part 720 has a high reflective index. In this case, the reflection part 720 reflects light output from the wavelength conversion member 400 toward the light emitting diodes 300.

Accordingly, the reflection-transmission part 700 allows light output from the light emitting diodes 300 to be effectively incident into the wavelength conversion member 400, and allows light leaking from the wavelength conversion member 400 to be re-incident into the wavelength conversion member 400.

Therefore, the liquid crystal display according to the embodiment can represent improved brightness and improved color reproduction due to the reflection-transmission part 700.

The heat dissipating part 800 is connected to the reflection-transmission part 700. In more detail, the heat dissipating part 800 may be directly or indirectly connected to the reflection-transmission part 700. The heat dissipating part 800 dissipates heat transferred from the reflection-transmission part 700.

Referring to FIGS. 1, 6, and 7, the heat dissipating part 800 includes a first heat dissipating part 810 and a second heat dissipating part 820.

The first heat dissipating part 810 is provided at the FPCB 600. In more detail, the first heat dissipating part 810 is provided inside the FPCB 600. The first heat dissipating part 810 may include the FPCB 600. In other words, the first heat dissipating part 810 may be a part of the FPCB 600.

The first heat dissipating part 810 may be provided on the wavelength conversion member 400. In addition, the first heat dissipating part 810 may extend in the extension direction of the wavelength conversion member 400. In addition, the first heat dissipating part 810 is connected to the reflection-transmission part 700. In more detail, the first heat dissipating part 810 may directly make contact with the reflection-transmission part 700.

The first heat dissipating part 810 may include a material having high thermal conductivity. For example, the first heat dissipating part 810 may include metal such as copper (Cu).

As shown in FIG. 6, the first heat dissipating part 810 includes a contact part 811, a connection via 812, and a heat radiation pad 813.

The contact part 811 directly or indirectly makes contact with the reflection-transmission part 700. The connection via 812 is connected to the contact part 811 and the heat radiation pad 813. In other words, the connection via 812 connects the contact part 811 with the heat radiation pad 813.

The heat radiation pad 813 is connected to the connection via 812. The heat radiation pad 813 may be exposed to the outside. The heat radiation pad 813 dissipates heat transferred from the reflection-transmission part 700 to the outside, especially, into the air.

The second heat dissipating part 820 is provided under the wavelength conversion member 400. In more detail, the second heat dissipating part 820 may be provided under the light emitting diodes 300. The second heat dissipating part 820 is connected to the reflection-transmission part 700. In more detail, the second heat dissipating part 820 may directly make contact with the reflection-transmission part 700.

The second heat dissipating part 820 may have a shape extending in an extension direction of the wavelength conversion member 400. For example, the second heat dissipating part 820 may have a bar shape or a strip shape extending in the extension direction of the wavelength conversion member 400.

The second heat dissipating part 820 may include a material having high thermal conductivity. For example, the second heat dissipating part 820 may include metal such as aluminum (Al) or copper (Cu).

The second heat dissipating part 820 may dissipate heat transferred from the reflection-transmission part 700 to the outside, especially, into the air.

A first adhering member 301 may be interposed between the reflection-transmission part 700 and the light emitting diodes 300. The first adhering member 301 may adhere to the light exit surface of the light emitting diodes 300 and the reflection-transmission part 700.

A second adhering member 201 may be interposed between the wavelength conversion member 400 and the light guide plate 200. The second adhering member 201 may adhere to the wavelength conversion member 400 and the light guide plate 200.

The first and second adhering members 301 and 201 may be transparent. The first and second adhering members 301 and 201 may include epoxy-based resin, acryl-based resin, or silicon-based resin.

In addition, the refractive index of the transmission part 710 may be an intermediate value between the refractive indexes of the first adhering member 301 and the tube 401. Accordingly, light loss can be minimized between the first adhering member 301 and the wavelength conversion member 400.

The optical sheets 500 are provided on the light guide plate 200. The optical sheets 500 improve the characteristic of the light passing through the optical sheets 500.

The FPCB 600 is electrically connected to the light emitting diodes 300. The FPCB 600 may mount the light emitting diodes 300 thereon. The FPCB 600 is installed in the mold frame 10 and arranged on the light guide plate 200.

Referring to FIG. 6, the FPCB 600 may include the first heat dissipating part 810. The FPCB 600 may include a support layer 610, a first interconnection layer 620, a second interconnection layer 630, a first protective layer 640, and a second protective layer 650.

The support layer 610 supports the first interconnection layer 620, the second interconnection layer 630, the first protective layer 640, and the second protective layer 650. The support layer 610 includes an insulating layer. The support layer 610 may be flexible. The material constituting the support layer 610 may include polymer such as polyimide-based resin.

The first interconnection layer 620 is provided on the support layer 610. The first interconnection layer 620 may directly make contact with the top surface of the support layer 610. The first interconnection layer 620 may include Cu.

The second interconnection layer 630 is provided under the support layer 610. The second interconnection layer 630 may directly make contact with the bottom surface of the support layer 610. The second interconnection layer 630 may include Cu. The first and second interconnection layers 620 and 630 may be connected to each other through a via formed through the support layer 610.

The second interconnection layer 630 is connected to the light emitting diodes 300. In more detail, the light emitting diodes 300 may be electrically connected to the second interconnection layer 630 through a solder or a bump.

The first protective layer 640 is provided on the first interconnection layer 620. The first protective layer 640 covers the first interconnection layer 620. The first protective layer 640 protects the first interconnection layer 620. The first protective layer 640 may include an insulator such as polymer.

The second protective layer 650 is provided under the second interconnection layer 630. The second protective layer 650 covers the second interconnection layer 630. The second protective layer 650 protects the second interconnection layer 630. The second protective layer 650 may include an insulator such as polymer.

The first heat dissipating part 810 may be included the FPCB 600. In other words, the heat radiation pad 813 may be formed in line with the first interconnection layer 620. In addition, the connection via 812 may be formed through the support layer 610. The connection via 812 may be formed in line with the second interconnection layer 630. In addition, the first protective layer 640 may be formed therein with a first open region OR1 to expose the top surface of the heat radiation pad 813 to the outside.

The backlight unit is constructed by using the mold frame 10 and the backlight assembly 20. In other words, the backlight unit includes the mold frame 10 and the backlight assembly 20.

The liquid crystal panel 30 is provided inside the mold frame 10, and provided on the optical sheets 500.

The liquid crystal panel 30 displays images by adjusting intensity of the light passing through the liquid crystal panel 30. That is, the liquid crystal panel 30 is a display panel to display the images. The liquid crystal panel 30 includes a TFT substrate, a color filter substrate, a liquid crystal layer interposed between the above two substrates and polarizing filters.

As described above, the liquid crystal display according to the embodiment includes the reflection-transmission part 700. The light output from the light emitting diodes 300 may be easily incident into the wavelength conversion member 400 through the transmission part 710.

In addition, the light output in the opposite direction of the light guide plate 200 from the wavelength conversion member 400 is reflected toward the wavelength conversion member 400 by the reflection part 720.

Therefore, the liquid crystal display according to the embodiment can reduce the light leaking from the wavelength conversion member 400 and represent improved brightness.

In addition, the path of the light incident into the wavelength conversion member 400 may be increased due to the reflection part 720. Therefore, the liquid crystal display according to the embodiment can represent the improved wavelength conversion efficiency of the wavelength conversion member 400 and represent an improved color reproduction.

In addition, heat applied to the wavelength conversion member 400 can be easily dissipated through the reflection-transmission part 700 and the heat dissipating part 800. Therefore, the liquid crystal display according to the embodiment can prevent the host 440 and/or the wavelength conversion particles 430 from being denatured due to heat. Therefore, the liquid crystal display according to the embodiment can represent improved reliability and durability.

In addition, the liquid crystal display according to the embodiment can effectively reduce the temperature of the wavelength conversion member 400. Therefore, the liquid crystal display according to the embodiment can reduce the performance degradation of the wavelength conversion particles 430 according to the temperature increase and can represent an improved color reproduction.

Figure 10:
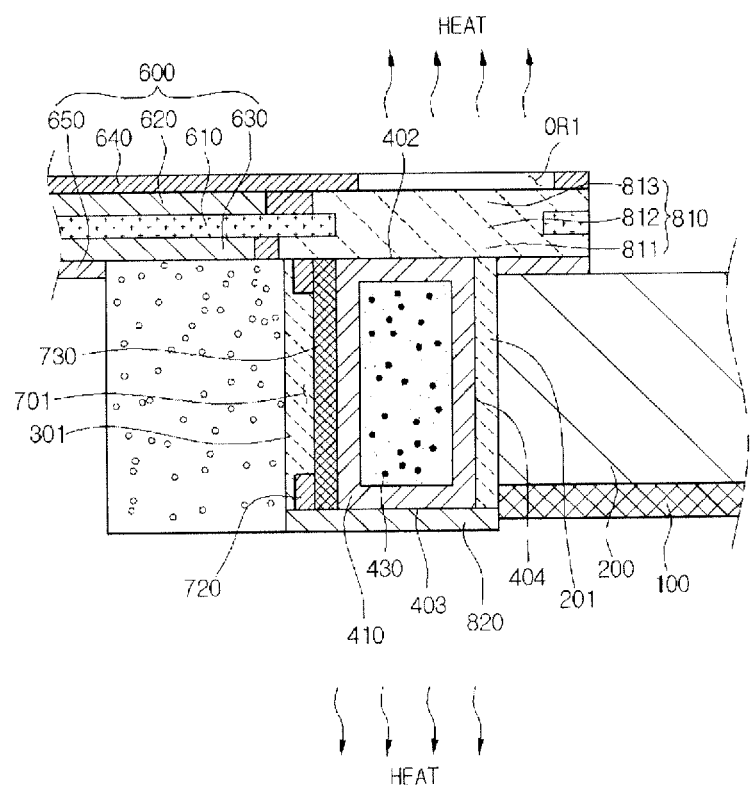
FIG. 10 is a sectional view showing a light emitting diode, a flexible printed circuit board, a wavelength conversion member, and a light guide plate according to the second embodiment.

FIG. 8 is a perspective view showing a wavelength conversion member and a reflection-transmission part according to a second embodiment, FIG. 9 is a sectional view taken along line C-C' of FIG. 8, and FIG. 10 is a sectional view showing a light emitting diode, a flexible printed circuit board, a wavelength conversion member, and a light guide plate according to the second embodiment. Hereinafter, the present embodiment will be described by making reference to the above description of the liquid crystal display. The description of the previous embodiment may be incorporated in the description of the present embodiment except for the modifications.

Referring to FIGS. 8 and 9, the reflection-transmission part 700 includes an anti-reflective layer 730 and the reflection part 720.

The anti-reflective layer 730 is formed on the whole light incident surface of the wavelength conversion member. The anti-reflective layer 730 is transparent. The anti-reflective layer 730 may include silicon oxide or magnesium fluoride.

The reflection part 720 is formed on the anti-reflective layer 730. The reflection part 720 may be formed on the whole anti-reflective layer 730. The reflection part 720 may be directly coated on the anti-reflective layer 730.

The reflection part 720 includes transmission holes 701 corresponding to the light emitting diodes 300. In more detail, the transmission holes 701 correspond to the light incident surface of the light emitting diodes 300. In more detail, the transmission holes 701 expose the top surface of the anti-reflective layer 730.

The light output from the light emitting diodes 300 is incident into the anti-reflective layer 730 through the transmission holes 701. In more detail, the transmission holes 701 serve as a transmission part to transmit the light output from the light emitting diodes 300.

The size of each transmission hole 701 may correspond to or greater than the size of the light exit surface of the light emitting diodes 300. The plane shape of the transmission holes 701 may correspond to the plane shape of the light incident surface of the light emitting diodes 300. In more detail, an outer portion of the transmission holes 701 may surround an outer portion of the light incident surface of the light emitting diodes 300.

Referring to FIG. 10, the first adhering member 301 may be filled in the transmission holes 701. Therefore, the first adhering member 301 may adhere to the anti-reflective layer 730.

Since the anti-reflective layer 730 is formed without an additional process, the reflection-transmission part 700 may be easily formed.

Figure 11:
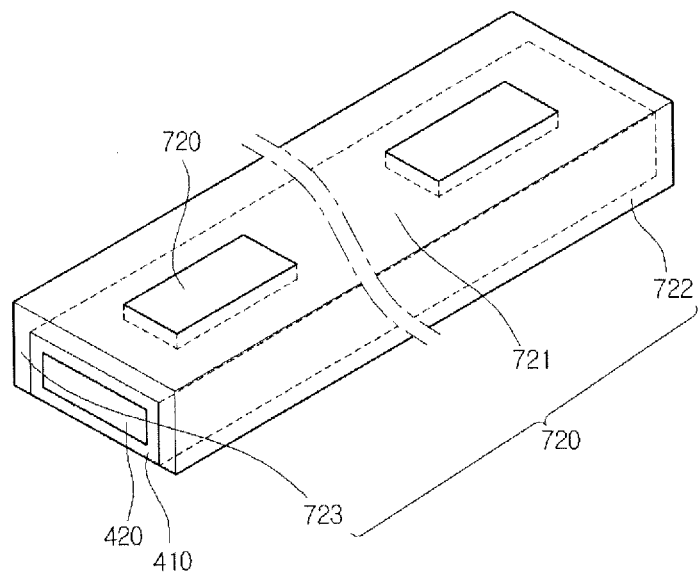
FIG. 11 is a perspective view showing a reflection-transmission part and a wavelength conversion member according to a third embodiment.
Figure 12:
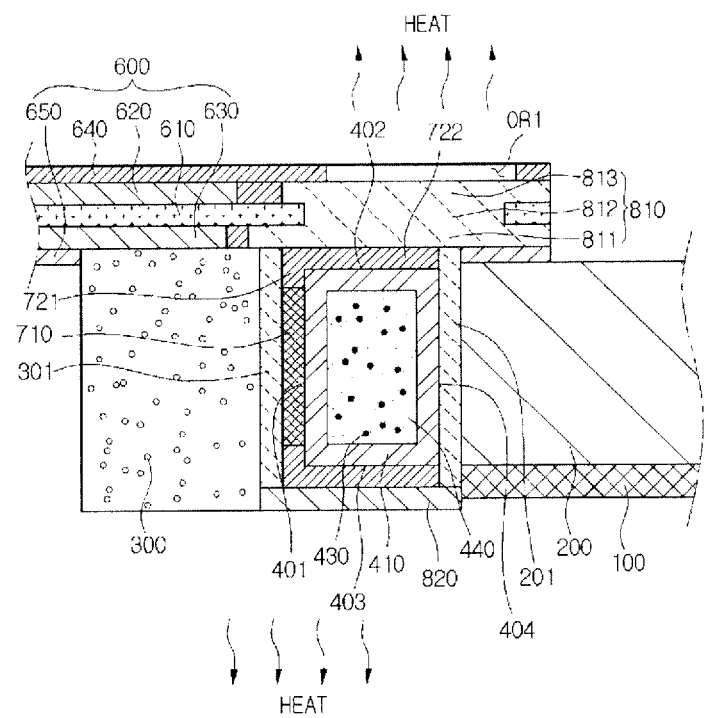
FIG. 12 is a sectional view showing a light emitting diode, a flexible printed circuit board, a wavelength conversion member, and a light guide plate according to the third embodiment.

FIG. 11 is a perspective view showing a reflection-transmission part and a wavelength conversion member according to a third embodiment, and FIG. 12 is a sectional view showing a light emitting diode, an FPCB, a wavelength conversion member, and a light guide plate according to the third embodiment. Hereinafter, the present embodiment will be described by making reference to the above description of the liquid crystal display. The description of the previous embodiment may be incorporated in the description of the present embodiment except for the modifications.

Referring to FIGS. 11 and 12, the reflection part 720 is provided on the light incident surface 401, the top surface 402, and the bottom surface 403 of the wave conversion member 400. In other words, the reflection part 720 may cover the above surfaces 401, 402, and 403 of the wavelength conversion member 400. In this case, the light incident surface 401 of the wavelength conversion member 400 is provided in opposition to the light emitting diodes 300. In addition, a light exit surface 404 of the wavelength conversion member 400 is provided in opposition to the light guide plate 200. In addition, the light incident surface 401 and the light exit surface 404 of the wavelength conversion member 400 are provided in opposition to each other.

The top surface 402 and the bottom surface 403 of the wavelength conversion member 400 extend from the light incident surface 401 of the wavelength conversion member 400 to the light exit surface 404 of the wavelength conversion member 400. The top surface 402 and the bottom surface 403 of the wavelength conversion member 400 are provided in opposition to each other.

The reflection part 720 includes a front reflection part 721, an upper reflection 722, and a lower reflection part 723.

The front reflection part 721 is provided on the light incident surface 401 of the wavelength conversion member 400. The front reflection part 721 may be the substantially same as the reflection part 720 of the previous embodiments.

The upper reflection part 722 is provided on the top surface 402 of the wavelength conversion member 400. The upper reflection part 722 extends from the front reflection part 721 to the light guide plate 200. In addition, the upper reflection part 722 may correspond to the first heat dissipating part 810. In more detail, the upper reflection part 722 may directly make contact with the contact part 811 of the first heat dissipating part 810.

The lower reflection part 723 is provided on the bottom surface 403 of the wavelength conversion member 400. The lower reflection part 723 extends from the front reflection part 721 to the light guide plate 200. In addition, the lower reflection part 723 may correspond to the second heat dissipating part 820. In more detail, the lower reflection part 723 may directly make contact with the second heat dissipating part 820.

In addition, the front reflection part 721, the upper reflection part 722, and the lower reflection part 723 may be integrally formed with each other.

Light leaking upward or downward from the wavelength conversion member 400 can be reduced by the upper and lower reflection parts 722 and 723. Accordingly, the liquid crystal display according to the embodiment may represent improved brightness and an improved color reproduction.

In addition, the heat applied to the wavelength conversion member 400 may be more effectively transferred to the heat dissipating parts 810 and 820 by the upper and lower reflection parts 722 and 723. Therefore, the liquid crystal display according to the present embodiment may represent improved reliability and improved durability.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A backlight assembly comprising:
a plurality of light sources;
a printed circuit board (PCB) on which the plurality of light sources is disposed;
a wavelength conversion member adjacent to the plurality of light sources;
a light guide plate to which a light is incident;
an optical sheet on the light guide plate; and
a reflection-transmission part between the plurality of light sources and the wavelength conversion member;
wherein the reflection-transmission part comprises a reflection part and a transmission part;
wherein the reflection part comprises:
an upper reflection part that is disposed on a top surface of the wavelength conversion member,
a lower reflection part that is disposed under a bottom surface of the wavelength conversion member, and
a front reflection part that is disposed between the upper reflection part and the lower reflection part;
wherein the transmission part comprises a plurality of transmission holes and a position of each of the transmission holes corresponds to a position of each of the light sources;
wherein the plurality of transmission holes is disposed on the front reflection part,
wherein the wavelength conversion member includes quantum dots (QDs),
wherein the light sources are disposed on a lateral side of the light guide plate, and
wherein the wavelength conversion member is disposed between the plurality of light sources and the light guide plate.

2. The backlight assembly of claim 1, wherein sizes of the plurality of transmission holes are greater than sizes of light exit surfaces of the plurality of light sources.

3. The backlight assembly of claim 1, wherein the wavelength conversion member comprises an incident surface to which a light from the light sources is incident, an exit surface from which the light exits, a top surface, and a bottom surface.

4. The backlight assembly of claim 1, wherein the front reflection part is disposed between the wavelength conversion member and the plurality of light sources.

5. The backlight assembly of claim 1, wherein the light conversion member comprises a tube and a matrix in the tube.

6. The backlight assembly of claim 5, wherein the QDs are distributed in the matrix.

7. The backlight assembly of claim 1, wherein the upper reflection part has a width greater than that of the top surface of the wavelength conversion member.

8. The backlight assembly of claim 1, wherein the lower reflection part has a width greater than that of the bottom surface of the wavelength conversion member.

9. The backlight assembly of claim 1, further comprising an adhering member disposed between the reflection-transmission part and the printed circuit board (PCB).

10. A display device comprising:
a mold frame;
a backlight assembly on the mold frame; and
a liquid crystal panel on the backlight assembly;
wherein the backlight assembly comprises:
a plurality of light sources;
a printed circuit board (PCB) on which the plurality of light sources is disposed;
a wavelength conversion member adjacent to the plurality of light sources;
a light guide plate to which a light is incident;
an optical sheet on the light guide plate; and
a reflection-transmission part between the plurality of light sources and the wavelength conversion member;

wherein the reflection-transmission part comprises a reflection part and a transmission part;

wherein the reflection part comprises:

an upper reflection part that is disposed on a top surface of the wavelength conversion member, a lower reflection part that is disposed under a bottom surface of the wavelength conversion member, and a front reflection part that is disposed between the upper reflection part and the lower reflection part;

wherein the transmission part comprises a plurality of transmission holes and a position of each of the transmission holes corresponds to a position of each of the light sources;

wherein the plurality of transmission holes is disposed on the front reflection part, wherein the wavelength conversion member includes quantum dots (QDs), wherein the light sources are disposed on a lateral side of the light guide plate, and wherein the wavelength conversion member is disposed between the plurality of light sources and the light guide plate.

11. The display device of claim 10, wherein sizes of the transmission holes are greater than sizes of light exit surfaces of the light sources.

12. The display device of claim 10, wherein the wavelength conversion member comprises an incident surface to which a light from the light sources is incident, an exit surface from which the light exits, a top surface, and a bottom surface.

13. The display device of claim 10, wherein the front reflection part is disposed between the wavelength conversion member and the plurality of light sources.

14. The display device of claim 10, wherein the light conversion member comprises a tube and a matrix in the tube.

15. The display device of claim 14, wherein the QDs are distributed in the matrix.

16. The display device of claim 10, wherein the upper reflection part has a width greater than that of the top surface of the wavelength conversion member.

17. The display device of claim 10, wherein the lower reflection part has a width greater than that of the bottom surface of the wavelength conversion member.

18. The display device of claim 10, further comprising an adhering member disposed between the reflection-transmission part and the printed circuit board (PCB).

* * * * *